(12) United States Patent
Liesche et al.

(10) Patent No.: US 9,898,534 B2
(45) Date of Patent: Feb. 20, 2018

(54) AUTOMATICALLY ADAPTING A USER INTERFACE

(75) Inventors: Stefan Liesche, Boeblingen (DE); Andreas Nauerz, Boeblingen (DE); Stefan Schmitt, Holzgerlingen (DE); Holger Waterstrat, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1856 days.

(21) Appl. No.: 11/865,754

(22) Filed: Oct. 2, 2007

(65) Prior Publication Data

US 2008/0189628 A1  Aug. 7, 2008

(30) Foreign Application Priority Data

Oct. 2, 2006 (EP) .................................. 06121623

(51) Int. Cl.
  *G06F 17/30* (2006.01)
  *H04L 29/08* (2006.01)

(52) U.S. Cl.
  CPC .. *G06F 17/30867* (2013.01); *G06F 17/30702* (2013.01); *H04L 67/22* (2013.01)

(58) Field of Classification Search
  USPC .................................................. 715/744–747
  See application file for complete search history.

(56) References Cited

U.S. PATENT DOCUMENTS

| 6,691,106 | B1 | 2/2004 | Salhyanarayan | |
|---|---|---|---|---|
| 6,941,339 | B1 | 9/2005 | McMichael | |
| 6,978,249 | B1 | 12/2005 | Beyer et al. | |
| 2003/0046401 | A1* | 3/2003 | Abbott | G06F 9/4443 709/228 |
| 2003/0182394 | A1* | 9/2003 | Ryngler | G01C 21/3629 709/217 |
| 2004/0255027 | A1* | 12/2004 | Vass et al. | 709/226 |
| 2005/0267869 | A1 | 12/2005 | Horvitz et al. | |
| 2005/0278386 | A1* | 12/2005 | Kelly et al. | 707/200 |
| 2006/0168259 | A1* | 7/2006 | Spilotro et al. | 709/229 |
| 2006/0179410 | A1* | 8/2006 | Deeds | 715/750 |
| 2006/0258397 | A1* | 11/2006 | Kaplan et al. | 455/556.1 |

(Continued)

FOREIGN PATENT DOCUMENTS

| EP | 1130869 | 9/2001 |
|---|---|---|
| EP | 1195967 | 4/2002 |
| EP | 1199860 | 4/2002 |

OTHER PUBLICATIONS

Profile-based product demand forecasting http://www.freepatentsonline.com/6978249.html.

(Continued)

*Primary Examiner* — Christopher J Fibbi
(74) *Attorney, Agent, or Firm* — DeLizio Law, PLLC

(57) ABSTRACT

A portal server comprises memory, a profile manager, a profile selector, and a profile initiator. The profile manager is configured to manage a plurality of profile records in a profile database. The profile selector is configured to select at least one of the plurality of profile records based on context data collected at a client and context data collected at the portal server. The collected context data corresponds to particular user interaction activity with the portal server. The profile initiator is configured to adapt a user interface based on the profile selected by the profile selector.

21 Claims, 8 Drawing Sheets

| Profile | Current Theme | Current Default Skin | Available Pages | Contacts | Other attributes |
|---|---|---|---|---|---|
| Office | Business | Business | Welcome<br>My Finances<br>My Work<br>Intranet news<br>My Bookmarks<br>Calendar | Manager<br>Colleagues | ... |
| Traveling | Businessmall | Businessmall | Welcome<br>My Travel<br>My Weather | Manager | ... |
| Leisure | Funny | Funny | Welcome<br>My Games<br>Mycinema program<br>Restaurants | Julia | ... |

(56) References Cited

U.S. PATENT DOCUMENTS

2007/0136266 A1* 6/2007 Su et al. .......................... 707/4
2010/0185605 A1* 7/2010 Chu et al. ..................... 707/722
2011/0022587 A1* 1/2011 Aravamudan et al. ....... 707/723

OTHER PUBLICATIONS

Web Usage Patterns www.ist.psu.edu/faculty_pages/giles IST497/presentations/McFadden.ppt.

Improving community-portals usability http://www.lsi.us.es/redmidas/Capitulos/LMD31.pdf "dynamic organization of the web site structure based on metadata about users (per-user) and contents (per-site)."

"PCT Application PCT/EP2007/057872 International Search Report and Written Opinion", dated Dec. 5, 2007, 12 pgs.

"PCT Application PCT/EP2007/057872 Preliminary Report on Patentability", dated Apr. 22, 2009, 7 pgs.

* cited by examiner

| Profile | Date | Time | Time zone | Location / regional setting | IP | Client device | Client markup | Nav. position | Actions perf. | Tasks avail. | Contact avail. | User profile |
|---|---|---|---|---|---|---|---|---|---|---|---|---|
|  | 20% | 15% | 10% | 5% | 25% | 10% | 5% | 2.5% | 2.5% | 2.5% | 2.5% | 0% |
| Office | Between Monday and Friday | After 8am ]] before 5pm | CET | DE | 9.162.* | PC | HTML | My Work | - | Claim tickets | Manager | - |
| Traveling | Between Monday and Friday | After 8am ]] before 5pm | CET | DE | 9.162.* | PDA | HTML | My Travel | - | - | - | - |
| Leisure | Saturday Sunday | After 5pm ]] before 11pm | CET | DE | 192.* | PC | HTML | Games | - | None | Julia | - |

FIG. 4

| Profile | Date | Time | Time zone | Location / regional setting | IP | Client device | Client markup | Nav. position | Actions perf. | Tasks avail. | Contact avail. | User profile |
|---|---|---|---|---|---|---|---|---|---|---|---|---|
| | 20% | 15% | 10% | 5% | 25% | 10% | 5% | 2.5% | 2.5% | 2.5% | 2.5% | 0% |
| Collected data | Tuesday | 9:22am | CET | DE | 9.162.1.1 | PC | HTML | News | - | Claim tickets | Manager | - |
| Office 95% | 20 | 15 | 10 | 5 | 25 | 10 | 5 | 0 | 0 | 2.5 | 2.5 | 0 |
| Travelin g 40% | 20 | 15 | 0 | 0 | 0 | 0 | 5 | 0 | 0 | 0 | 0 | 0 |
| Leisure 30% | 0 | 0 | 10 | 5 | 0 | 10 | 5 | 0 | 0 | 0 | 0 | 0 |

FIG. 5

| Profile | Current Theme | Current Default Skin | Available Pages | Contacts | Other attributes |
|---|---|---|---|---|---|
| Office | Business | Business | Welcome<br>My Finances<br>My Work<br>Intranet news<br>My Bookmarks<br>Calendar | Manager<br>Colleagues | ... |
| Traveling | Businessmall | Businessmall | Welcome<br>My Travel<br>MyWeather | Manager | ... |
| Leisure | Funny | Funny | Welcome<br>MyGames<br>Mycinema program<br>Restaurants | Julia | ... |

FIG. 7

AUTOMATICALLY ADAPTING A USER INTERFACE

CROSS-REFERENCE TO RELATED APPLICATIONS

This application claims priority under 35 U.S.C. § 119 to European Application No. 06121623.0 filed on Oct. 2, 2006, and entitled "METHOD AND SYSTEM OF AUTOMATICALLY ADAPTING A USER INTERFACE," which is hereby incorporated by reference herein in its entirety.

FIELD

Embodiments of the invention(s) relate to a method of automatically adapting a user interface, particularly adapting a web portal user interface, and a computer apparatus, data processing program, computer program product, and computer data signal therefore.

BACKGROUND

For providing data access to various information channels through a single user interface, portals are known, particularly portals on the world-wide-web (www). Typically, such portals are accessed by a number of different users showing differing usage behaviour, using a variety of computer system types to access the portal, having different permissions to access specific data provided by the portal, being subject to different networking conditions when accessing the portal, etc. Consequently, current portal solutions offer functionality to enhance user experience by adapting the user interface depending on the user and/or usage conditions. Such portals can detect the markup language supported in the web-browser of the user, or the version information of the web-browser, and associate these findings to manually pre-programmed, different versions of web-pages or portlets, which are then appropriately presented to the user. Further, systems are known that provide content filtering according to user permissions or attributes. Oftentimes, these systems also allow users to manually modify the way in which information is presented by the portal according to their personal preferences.

Some systems have been proposed that provide capabilities for deriving a profile based on user behaviour. Another system automatically generates a profile based on information given by a user in combination with dynamic user behaviour while using the portal, such as his navigating within an application. This profile is presented to the user, who may provide feedback to this profile. From these information sources, a final profile is derived that is being used by the portal to adapt its user interface.

SUMMARY

A portal server comprises memory, a profile manager, a profile selector, and a profile initiator. The profile manager is configured to manage a plurality of profile records in a profile database. The profile selector is configured to select at least one of the plurality of profile records based on context data collected at a client and context data collected at the portal server. The collected context data corresponds to particular user interaction activity with the portal server. The profile initiator is configured to adapt a user interface based on the profile selected by the profile selector.

BRIEF DESCRIPTION OF THE DRAWINGS

The present embodiments may be better understood, and numerous objects, features, and advantages made apparent to those skilled in the art by referencing the accompanying drawings.

FIG. 4 depicts is a schematic showing an exemplary profile database with profile records.

FIG. 5 depicts a schematic showing a data structure of an embodiment when matching context data with profile records.

FIG. 7 depicts a schematic showing a instantiation attributes stored with profile records in an exemplary profile database.

DESCRIPTION OF EMBODIMENT(S)

The description that follows includes exemplary systems, methods, techniques, instruction sequences and computer program products that embody techniques of the present embodiments of the invention(s). However, it is understood that the described embodiments may be practiced without these specific details. In other instances, well-known instruction instances, protocols, structures and techniques have not been shown in detail in order not to obfuscate the description.

Figure 1A:
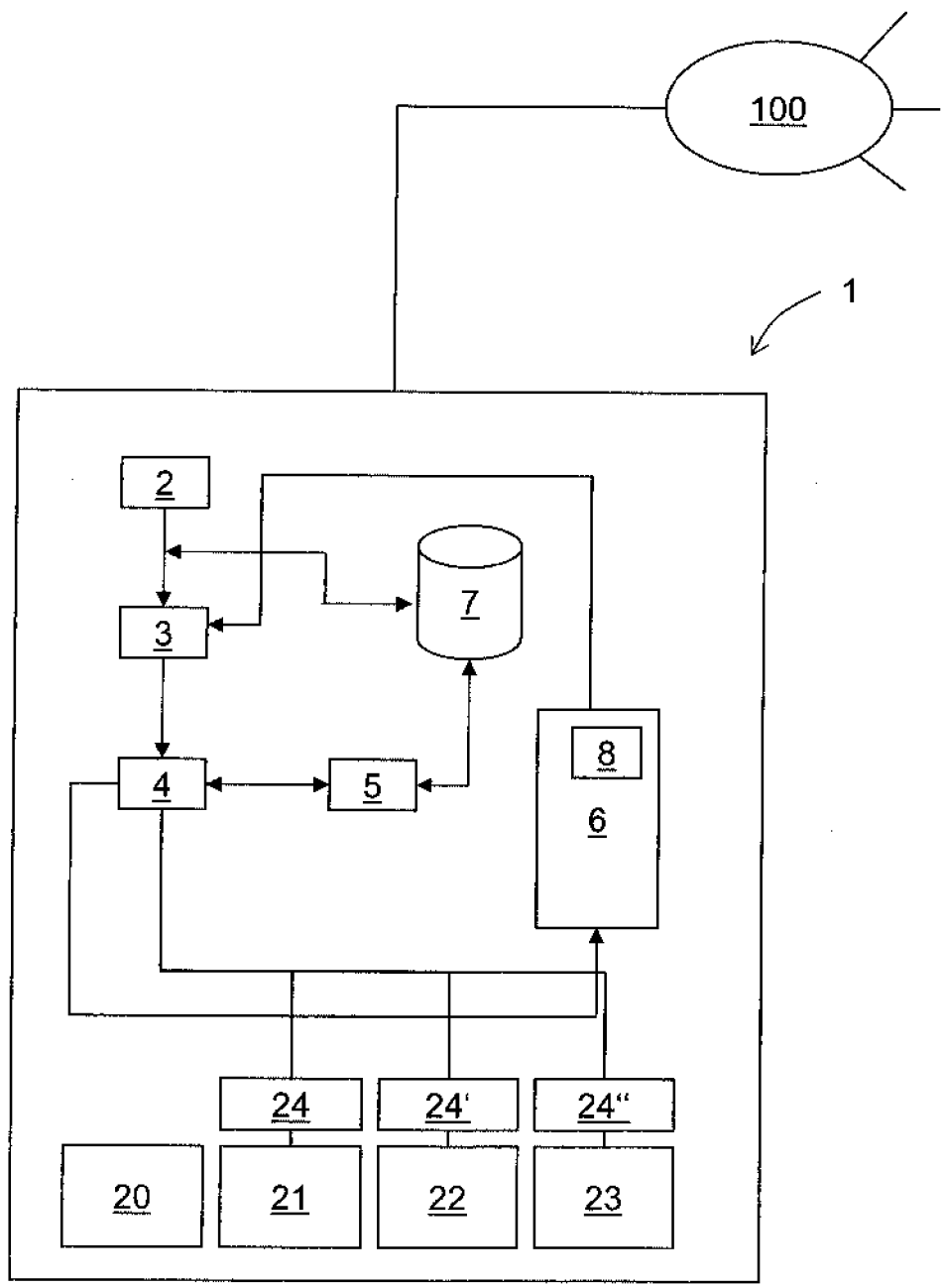
FIG. 1a depicts a block diagram showing a schematic overview of an embodiment of a portal server according to the present invention.

FIG. 1a is a block diagram giving a system overview of an embodiment of a portal server according to the present invention. Portal server computer system 1 is connected to internet or other computer network 100 and comprises a context detector 2 coupled to a profile selector 3. Profile selector 3 is in turn coupled to profile instantiator 4, the latter being coupled to a user interface 6 to enable the profile instantiator 4 to control (or adapt) the user interface 6. User interface 6 is coupled to profile selector 3 to enable the user interface 6 to provide manual profile selection to a user. For adapting the user interface, profile instantiator 4 is connected to and triggers instantiation handlers 24, 24', 24" that are connected to rendering engine 21, one or more portal applications 22, or one or more portal base services 23, respectively, as shown.

A request processor 20 comprised in server 1 is responsible for handling incoming requests and appropriate responses, and parses and validates incoming requests. Rendering engine 21 is invoked for each request to collect and combine markup fragments from different portal application components that make up the response. Portal applications 22 provide the actual content that a portal system provides. This group of components make use of portal base services 23 that offer functionality like search, content management, or collaboration via instant messaging or team rooms.

Context detector 2, profile selector 3 and profile instantiator 3 are configured to be integrated into the request processing flow in the portal server 1. Context detector 2 will be executed with every processed request. Profile instantiator 4 will trigger different handler instances 24, 24', 24" dependent on the profile definition. These instances are specifically bound to portal server components as the rendering engine 21, the applications 22 or base portal services 23. A specific instantiation handler 24 is invoked by profile instantiator 4 with a set of parameters that are selected according to the decision made by profile selector 3. For example, a navigation handler could be invoked to hide certain pages from the currently available navigation tree, or a collaboration service handler could change the user current instant messaging status to 'do not disturb'. Those instantiation handlers 24, 24', 24" will make use of programming interfaces available at the specific component to change the component's behaviour. Profile manager 5 is registered as portal application.

Further, in the embodiment shown, profile instantiator 4 is also coupled to profile manager 5 which in turn accesses a profile database 7. Alternatively, database 7 can be embodied based on a file system or any other type of persistent data store. Communication channels between profile instantiator 4, profile manager 5, and profile database 7 are all fully bidirectional with regard to read and write access to profile data.

Additionally, profile selector 3 is directly bidirectionally coupled to the profile database 7 in the same manner in this embodiment.

Figure 1B:
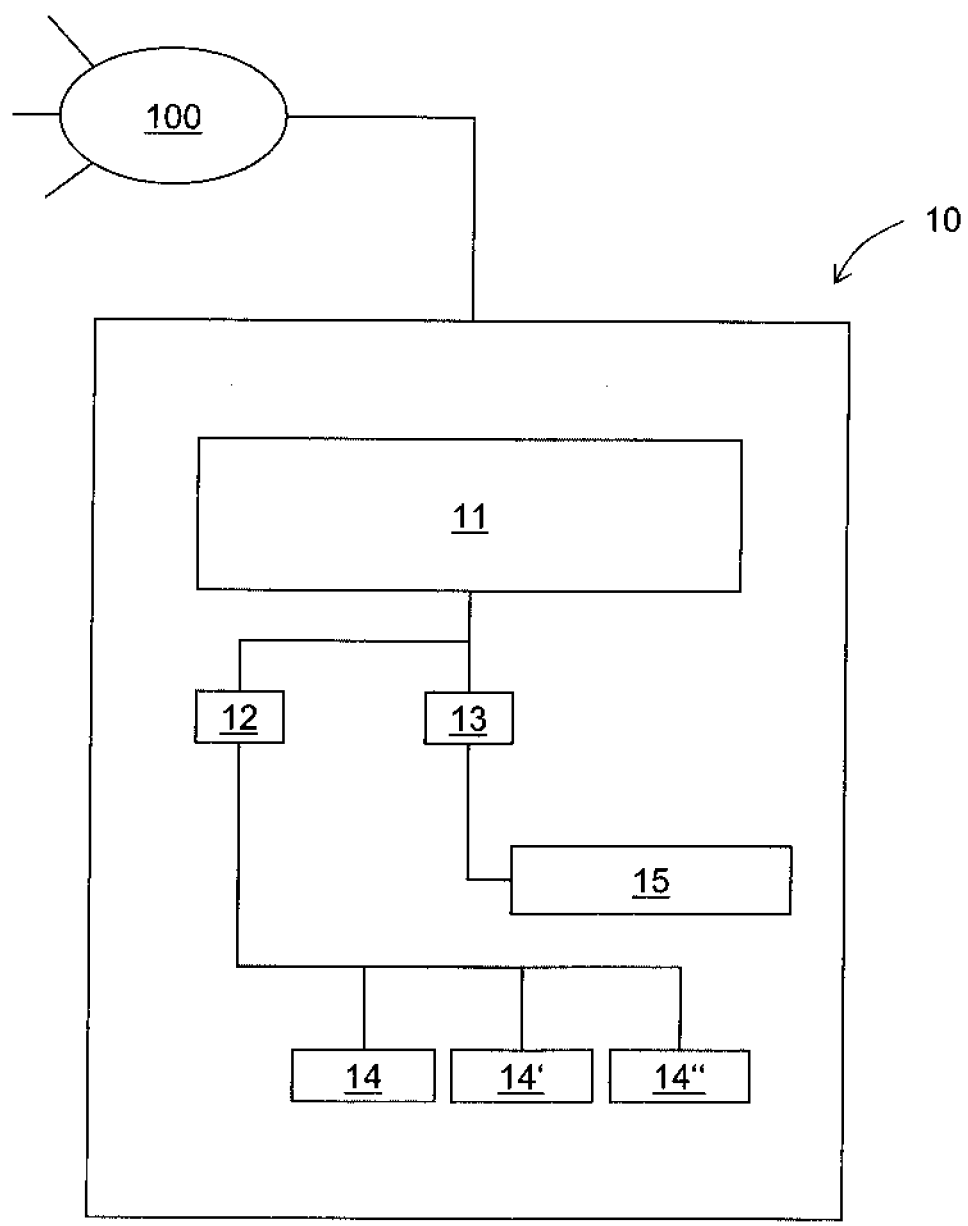
FIG. 1b depicts a block diagram showing a schematic overview of an embodiment of a client according to the present invention.

FIG. 1*b* is a block diagram giving a system overview of an embodiment of a client computer according to the present invention. Client 10 is connected to portal 1 over internet 100 and comprises a browser 11. Extension modules 12 and 13 are integrated into browser 11. Extension module 12 is connected to client-side application programs 14, 14', 14" in order to query the status of the application programs, thus collecting client-side context data of the user environment, such as the presence and state of active desktop applications on the client. In a similar manner, extension module 13 is connected to dedicated sensor application 15 which collects specific usage context information, such as the current state of a client-side IP phone or additional peripheral devices. Client-side context data thus collected are transmitted to portal server 1 either by network request/response on network 100 or by out-of-band communication over another channel.

Figure 2:
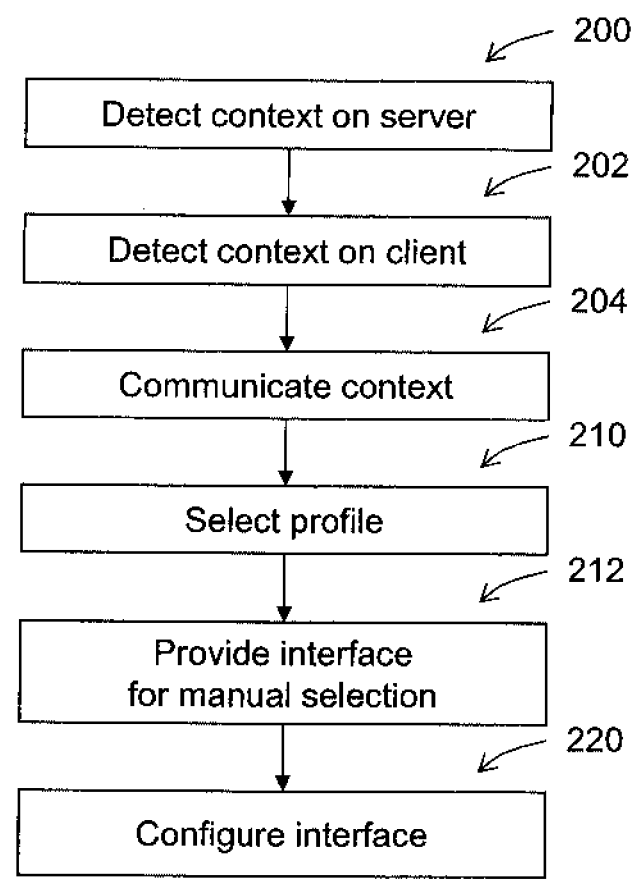
FIG. 2 depicts a block diagram giving an overview of an embodiment of the method according to the present invention.

In a typical usage scenario, as is illustrated in FIG. 2, in step 200 context detector 2 locally collects server-side context data of a particular user interaction, for instance from the portal usage history or other server-side data, typically including current navigational position of a user, or currently available contacts of a user. Further, in this step, context data from network requests from client 10 to the server 1 are collected, such as current IP address or current client device type. Such data from network requests typically reflect the network system configuration in the course of a particular usage transaction.

Further, in step 202, extension modules 12 and 13 of browser 11 in client 10 query application programs 14, 14', 14" or sensor application 15 to obtain client-side context data as described above, and communicate the data to the server 1 in step 204.

Thus, context detector 2 collects all data that is needed to appropriately detect the usage conditions, as will be described in more detail below, and then delivers these data to profile selector 3.

In step 210, profile selector 3 matches the set of collected context data to a database 7 having multiple profile records stored, each of which represents an interface adaptation profile and contains matching information and control information. Those profile records are either owned by certain users (user specific profiles) or available to all users (global profiles). User specific profiles are available only to the user that created them. Once profile selector 3 has found an optimal match between the detected context data and the matching information of a profile record, and no manual selection has been made to override this optimal match as described below, it delivers the control information of that respective profile record to profile instantiator 4. Alternatively, profile selector 3 merely sends a profile identifier to profile instantiator 4, which then accesses profile database 7 to extract the control information of the respective profile record. Such an access can either be a direct access, or can be handled via profile manager 5.

In step 212, the server provides an interface for allowing a user to select a profile manually. This is particularly advantageous if an automatic selection does not optimally reflect the desired user interface settings. Profiles that are currently available to the user are loaded and provided to the user via user interface 6. Then, users are offered a dialog in which they may select a better matching profile from the list of available profiles. This selection performed by the user is submitted by user interface 6 to the profile selector 3 first. The profile selector validates and processes the profile selection request and invokes the profile instantiator 4 accordingly; profile instantiator 4 instantiates and sets the new profile as described below.

In step 220, profile instantiator 4 interprets the control information and changes state and content of user interface elements in user interface 6 by appropriately triggering instantiation handlers 24, 24', 24", as given above and as will be further exemplified below. Changes to the user interface may affect its appearance, for instance graphical appearance, or the nature or availability of presented information.

Types of context data elements that are detected in step 200 and its potential use for adapting a user interface element appropriately are explained in the following table:

| | |
|---|---|
| Current date: | The profile could be different if the date is a Saturday/Sunday: a "leisure" profile would be applied. |
| Current time: | The profile could be different between 8 am and 5 pm than between 5 pm and 11 pm: between 8 am and 5 pm an "office" profile might be applied, after 5 pm a "leisure" profile might be applied. |
| Current time zone: | The profile could be different if the user has changed the time zone setting: the user is on travel and the "travelling" profile might be applied. |
| Current geographic location/current regional settings: | A change of these could be an indication that the user is on travel and the "travelling" profile might be applied |
| Current IP address: | A change could be an indication that the location has changed. Depending on the IP address the "office" or the "leisure" profiles might be applied. |
| Current client device: | The profile could be different depending on the client device used: the user might use his office PC at office, his PDA when traveling, a tablet PC at home. The corresponding profiles might be "office", "traveling", leisure". |

| | |
|---|---|
| Current markup: | See "current client device" |
| Current navigational position: | The profile could be changed if the user starts to navigate to different navigational positions. For instance, navigating to a node entitled "Games" could indicate that the profile "leisure" might be applied. |
| Current actions performed: | The profile could be changed if the user starts to work on certain tasks: working on certain business process related tasks could indicate that the profile "office" might be applied. |
| Current tasks available: | The profile could be different if there are a lot of business process related tasks available: the "office" profile might be applied. |
| Current contacts available: | If a lot of business contacts are available (indicates "business time") the profile to be applied might be "office", if a lot of private contacts are available the profile to be applied might be "leisure". |
| Current user profile: | The currently selected profile can be used to determine a better matching profile for changed contextual situations. E.g. if the user is currently in "leisure - news and sports", it is more likely that the next profile is "leisure - favourite games" than "office - monday morning". |
| Page referer: | The last link that the user followed to the current page can be used to determine the context of the user's current work. |
| Browser History: | The list of visited web sites/pages can be used to determine the context of the user's current work. |
| State of client-side devices: | If the user is talking to a collegue via an IP phone, the instant messaging awareness state (e.g. "online and available", "busy", "away from keyboard", "offline") can reflect this by setting the user's state to, on the phone'. If MS PowerPoint is running in presentation mode, the IM awareness should set the state to, do not disturb'. |

After the context data have been collected for a particular usage situation, as described above, the profile selector identifies the best match between the detected context data and the profile records stored in the database.

Figure 3:
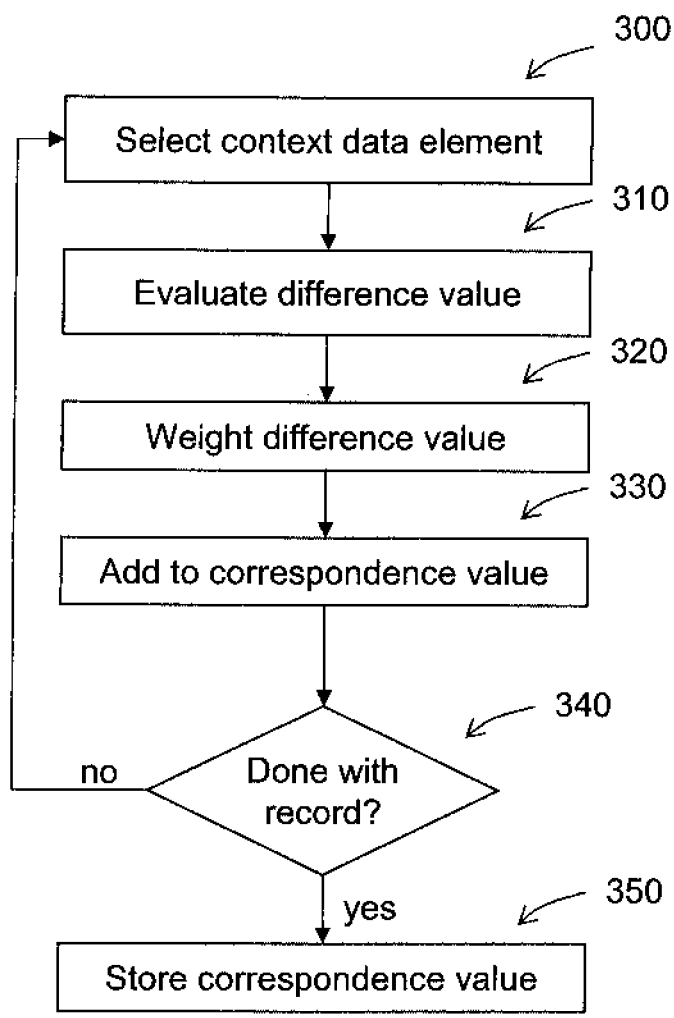
FIG. 3 depicts a block diagram showing a detail of an embodiment of the method.

One example for a matching procedure is illustrated in FIG. 3. For some or all of the context data elements of the types pointed out in the table above, that add up to the detected context data, one context data element is taken in step 300 and a difference value to a corresponding data element of a profile record, or more precisely, of the matching information of a profile record, is calculated in step 310.

This calculation is performed by context dependent handler classes that are able to perform reasonable analysis of the collected data. For instance, internet protocol (IP)— addresses are matched against IP ranges, or "available tasks" are evaluated based on task properties and search criteria.

Then, this difference value is weighted by multiplication with a weighting factor in step 320. After each weighting, the difference value is added to a correspondence value representing the degree of matching between collected context data and the currently examined profile record. Alternatively, all weighted difference values are calculated first and are then summed up.

Thus, a correspondence value (being a weighted sum of the difference values of each available context data element and record profile data element) is generated for each profile record that is applicable to the current user. The record corresponding to the optimal correspondence value can be chosen and the current context data and the chosen profile is finally stored for further profile adaptation in the data storage in step 350.

An example for this is given in FIGS. 4 and 5. FIG. 4 shows a record profile database 7 having three record profiles "Office", "Travelling", and "Leisure", shown in rows, and the matching information of these profile records according to different data types, shown in columns. For instance, profile "Office" has a "Date" matching range "from Monday to Friday", and a "Time" matching range "from 8 am to 5 pm". Further, weighting factors associated with the different data types are stored in this database, 20% for "Date", 15% for "Time", etc.

FIG. 5 shows a visualization of how the matching is performed. First, a correspondence value for profile record "Office" is to be calculated. Context data detected in step 200 are shown in row 3. In this case, a context data element of type "Date" is selected, and the difference value is evaluated in step 310 by comparing context data element value "Tuesday" to the data matching range of the profile record, "Monday to Friday". Since Tuesday is between Monday and Friday, the difference value is set to 1 in step 310, and weighted with the corresponding factor of 20%, so that the weighted difference value for this comparison is 20%. This is similarly performed for all the other data types shown in the same row of this Figure, and the sum of all weighted difference values, i.e. the correspondence value, is 95% for profile "Office".

Similarly, correspondence values are calculated for the other profiles. In this case "Office" is the best match and is the result of step 210.

Figure 6:
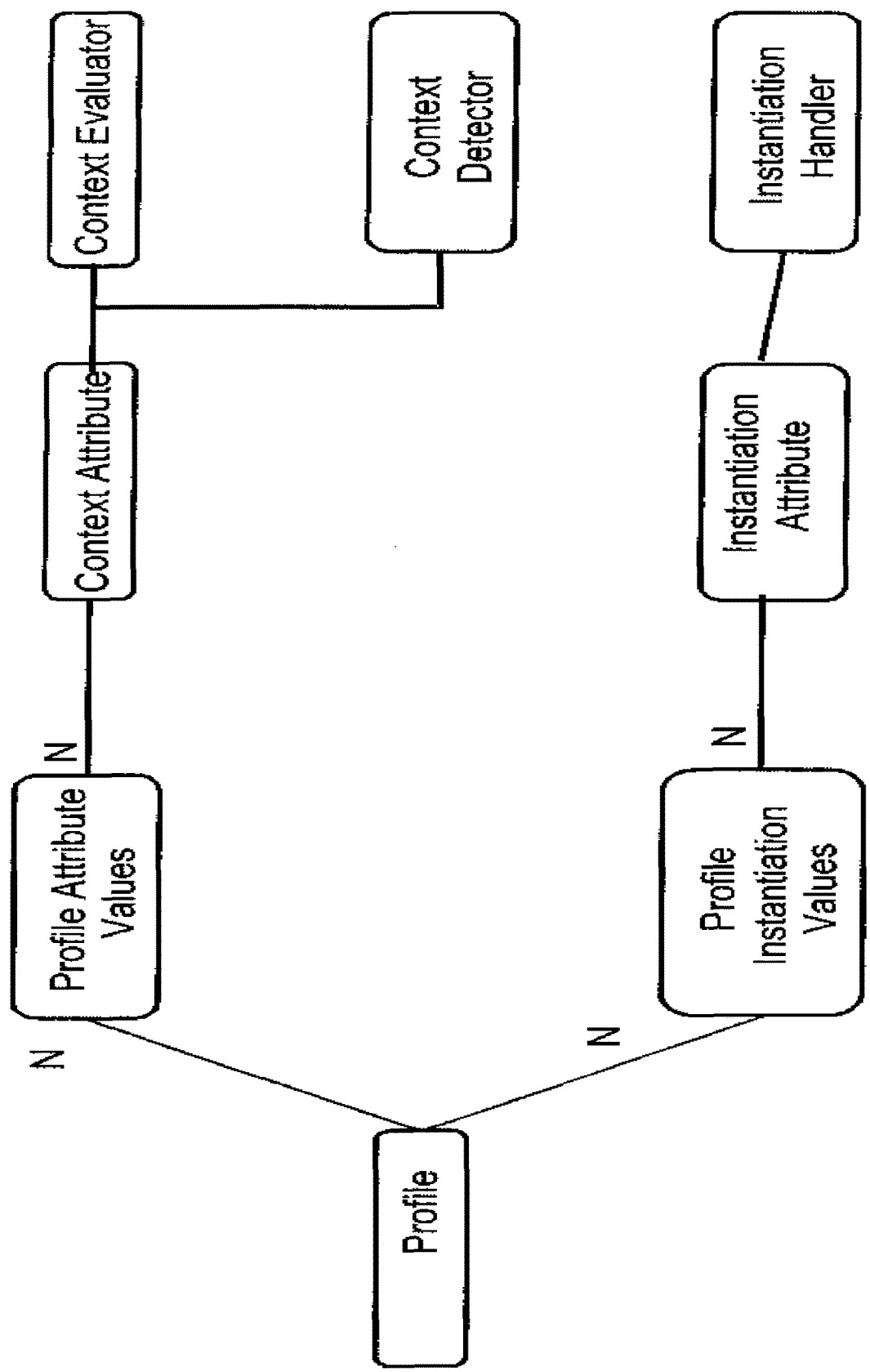
FIG. 6 depicts a schematic design diagram of an exemplary profile database.

Generally, a profile record is designed as shown in FIG. 6. A profile record comprises two main set of data objects: profile attributes values and profile instantiation values.

Profile attributes are compared against collected contextual data to compute the correspondence value. Therefore profile attributes belong to a certain type of context attribute, while each context attribute has a designated evaluator and detector component assigned: The context detector collects the data for a context attribute (e.g. "day of week"="Monday"). The context evaluator compares this value with the corresponding attribute value in the profile (e.g. "day of week" between "Monday" and "Friday") to computer the correspondence value.

Profile instantiation values describe the modifications to the user interface that are performed during profile instantiation. An instantiation handler is responsible to modify the user interface according to an instantiation value (e.g. "start page"="My favourite games") that is defined in the currently selected profile.

Then, as described with respect to step 220, this profile is applied by profile instantiator 4. Profile instantiator 4 accesses the control information associated with the best matching profile, "Office" in this example, and changes state and content of user interface elements in user interface 6. An example of such control information associated with profile records "Office", "Travelling" and "Leisure" is shown in FIG. 7. User interface element parameters of types "Theme", "Default Skin", "Available Pages", "Contacts", etc. are shown, such as the "Business" display theme for profile "Office", or the availability of pages "Welcome", "My Travel", "My Weather" for profile "Travelling".

Consequently, when state and content of the user interface is changed by profile instantiator 4, some or all of the following steps can be applied: switch the theme, switch the skin, display or hide pages, change contact lists, and/or perform further profile actions.

Further types of user interface parameters for adapting the user interface can include some or all of: selected content, navigation structure, business process filtering, current IM status, page layout, available portlets, page meta data for influencing portlet content, contents of personal document folder, bookmarks, favorites, user preferences, visible virtual team rooms.

Profile Manager 5 handles profile records stored in database 7, and provides functionality to create, modify and/or query profile records. Further, it provides functions for automated creation and/or adaptation of profile records through automated learning. Such learning can be based on detected context data, which cannot be matched to any profile in satisfactory manner, or on data collected about successful matchings, for instance such context data and record profiles.

Additionally, other historical data provided by the portal installation can be used, e.g. website usage data or site navigation data. Pattern analysis and learning algorithms can be performed on those data sets to create and modify profile data. In particular, context parameters or user interface parameters can be influenced by such processes, or the weighting factors for the profile selection algorithm can be adopted.

In an embodiment, the method and portal server 1 are configured to collect context data only on the server and perform the remaining method steps based on these server-side context data when connected to a client not having extension modules 12 and/or 13, such as a plain web client.

Embodiments can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

To avoid unnecessary repetitions, explanations given for one of the various embodiments are intended to refer to the other embodiments as well, where applicable. In and between all embodiments, identical reference signs refer to elements of the same kind. Moreover, reference signs in the claims shall not be construed as limiting the scope. The use of "comprising" in this application does not mean to exclude other elements or steps and the use of "a" or "an" does not exclude a plurality. A single unit or element may fulfil the functions of a plurality of means recited in the claims.

REFERENCE NUMERALS

1 Portal server
2 Context detector
3 Profile selector
4 Profile instantiator
5 Profile manager
6 User interface system
7 Profile database
8 User interface element
10 Client
11 Browser
12, 13 Extension module
14-14" Application program
15 Sensor application
20 Request processor
21 Rendering engine
22 Portal application
23 Portal base service
24-≥" Instantiation handler
100 Network
200 Detect context on server
202 Detect context on client
204 Communicate context
210 Select profile
212 Provide manual selection
220 Configure interface
300 Select context data element
310 Evaluate difference value
320 Weight difference value
330 Add to correspondence value
340 Done?
350 Store correspondence value, proceed with next record Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method performed at a portal server, the method comprising:
   receiving an incoming request from a client for a user interaction with the portal server;
   maintaining a plurality of profile records for adapting a user interface of the portal server for at least one usage condition associated with the user interaction;
   collecting collected context data based, at least in part, on client-side context data from the client and server-side context data from the portal server;
   calculating a plurality of correspondence values for the plurality of profile records, each correspondence value representing a weighted comparison between the collected context data and profile attributes associated with each profile record, wherein the weighted comparison is calculated using different weighting factors for each profile attribute;
   determining a set of currently available contacts for a user of the user interface based, at least in part, on the client-side context data;
   selecting a profile record from among the plurality of profile records based, at least in part, on the plurality of correspondence values and further based, at least in part, on a quantity of business contacts in the set of currently available contacts or a quantity of personal contacts in the set of currently available contacts; and
   adapting the user interface of the portal server to the at least one usage condition based, at least in part, on the profile record.

2. The method of claim 1, further comprising:
   determining the server-side context data for the user interaction based on at least one of the incoming request, portal usage history, navigational position of a user, and currently available contacts of the user; and
   receiving, at the portal server, the client-side context data from the client, wherein the client-side context data is based, at least in part, on a status of desktop applications of a user environment at the client.

3. The method of claim 1, wherein the collected context data comprises at least one of date, time, time zone, geographic location, regional settings, IP-address, type of client device, markup language, currently selected user profile, a set of currently available contacts, available tasks, performed actions, navigational position, and last visited page.

4. The method of claim 1, wherein calculating the plurality of correspondence values comprises, for each correspondence value, comparing multiple profile attributes of a profile record with the collected context data and calculating a weighted sum of comparison results.

5. The method of claim 1, wherein the profile record comprises a profile identifier and at least one profile attribute value for a first profile attribute, wherein a first weighting factor for the first profile attribute is different from a second weighting factor for a second profile attribute.

6. The method of claim 1, wherein adapting the user interface comprises:
   triggering instantiation handlers based, at least in part, on control information in the profile record, wherein the instantiation handlers adapt the user interface of the portal server to the at least one usage condition by configuring one or more of theme, default skin, available content, selected content, navigation structure, available contacts, business process filtering, current instant messaging status, page layout, available portlets, page meta data for influencing portlet content, contents of personal document folder, bookmarks, favorites, user preferences, and visible virtual team rooms.

7. A non-transitory machine-readable medium having stored therein a program product, which when executed on a set of one or more processors of a portal server, causes the set of one or more processors to perform operations that comprise:
   receiving an incoming request from a client for a user interaction with the portal server;
   maintaining a plurality of profile records for adapting a user interface of the portal server for at least one usage condition associated with the user interaction;
   collecting collected context data based, at least in part, on client-side context data from the client and server-side context data from the portal server;
   calculating a plurality of correspondence values for the plurality of profile records, each correspondence value representing a weighted comparison between the collected context data and profile attributes associated with each profile record, wherein the weighted comparison is calculated using different weighting factors for each profile attribute;
   determining a set of currently available contacts for a user of the user interface based, at least in part, on the client-side context data;
   selecting a profile record from among the plurality of profile records based, at least in part, on the plurality of correspondence values and further based, at least in part, on a quantity of business contacts in the set of currently available contacts or a quantity of personal contacts in the set of currently available contacts; and
   adapting the user interface of the portal server to the at least one usage condition based, at least in part, on the profile record.

8. The non-transitory machine-readable medium of claim 7, wherein the program product causes the set of one or more processors to perform operations that comprise:
   determining the server-side context data for the user interaction based on at least one of the incoming request, portal usage history, navigational position of a user, and currently available contacts of the user; and
   receiving, at the portal server, the client-side context data from the client, wherein the client-side context data is based, at least in part, on a status of desktop applications of a user environment at the client.

9. The non-transitory machine-readable medium of claim 8 wherein the collected context data comprises at least one of date, time, time zone, geographic location, regional settings, IP-address, type of client device, markup language, currently selected user profile, a set of currently available contacts, available tasks, performed actions, navigational position, and last visited page.

10. The non-transitory machine-readable medium of claim 8, wherein said operation of calculating the plurality of correspondence values comprises, for each correspondence value, comparing multiple data elements of a profile record with the collected context data and calculating a weighted sum of comparison results.

11. The non-transitory machine-readable medium of claim 7, wherein the profile record comprises a profile identifier and at least one profile attribute value for a first profile attribute, wherein a first weighting factor for the first profile attribute is different from a second weighting factor for a second profile attribute.

12. The non-transitory machine-readable medium of claim 7, wherein said operation of adapting the user interface comprises:
triggering instantiation handlers based, at least in part, on control information in the profile record, wherein the instantiation handlers adapt the user interface of the portal server to the at least one usage condition by configuring one or more of theme, default skin, available content, selected content, navigation structure, available contacts, business process filtering, current instant messaging status, page layout, available portlets, page meta data for influencing portlet content, contents of personal document folder, bookmarks, favorites, user preferences, and visible virtual team rooms.

13. The non-transitory machine-readable medium of claim 7, wherein the operations further comprise:
indicating the plurality of profile records available to a user;
receiving an indication of a manually-selected profile record selected by the user; and
adapting the user interface based, at least in part, on the manually-selected profile record.

14. A portal server comprising:
a processor;
a network interface configured to receive an incoming request from a client for a user interaction with the portal server;
memory having instructions stored therein which, when executed by the processor, cause the portal server to:
maintain a plurality of profile records for adapting a user interface of the portal server for at least one usage condition associated with the user interaction;
determine collected context data based, at least in part, on client-side context data from the client and server-side context data from the portal server;
calculate a plurality of correspondence values for the plurality of profile records, each correspondence value representing a weighted comparison between the collected context data and profile attributes associated with each profile record, wherein the weighted comparison is calculated using different weighting factors for each profile attribute;
determine a set of currently available contacts for a user of the user interface based, at least in part, on the client-side context data;
select a profile record from among the plurality of profile records based, at least in part, on the plurality of correspondence values and further based, at least in part, on a quantity of business contacts in the set of currently available contacts or a quantity of personal contacts in the set of currently available contacts; and
adapt the user interface of the portal server to the at least one usage condition based, at least in part, on the profile record selected by the profile selector.

15. The portal server of claim 14, wherein the instructions, when executed by the processor, cause the portal server to:
determine the server-side context data for the user interaction based on at least one of the incoming request, portal usage history, navigational position of a user, and currently available contacts of the user.

16. The portal server of claim 14 further comprising the network interface configured to receive the client-side context data from the client, wherein the client-side context data is based, at least in part, on a status of desktop applications of a user environment at the client.

17. The portal server of claim 14, wherein the instructions to adapt the user interface comprises instructions which, when executed by the processor cause the portal server to trigger instantiation handlers based, at least in part, on control information in the profile record, wherein the instantiation handlers adapt the user interface of the portal server to the at least one usage condition by configuring one or more of theme, default skin, available content, selected content, navigation structure, available contacts, business process filtering, current instant messaging status, page layout, available portlets, page meta data for influencing portlet content, contents of personal document folder, bookmarks, favorites, user preferences, and visible virtual team rooms.

18. A system comprising:
means for receiving an incoming request from a client for a user interaction with a portal server;
means for maintaining a plurality of profile records for adapting a user interface of the portal server for at least one usage condition associated with the user interaction;
means for collecting collected context data based, at least in part, on client-side context data from the client and server-side context data from the portal server;
means for calculating a plurality of correspondence values for the plurality of profile records, each correspondence value representing a weighted comparison between the collected context data and profile attributes associated with each profile record, wherein the weighted comparison is calculated using different weighting factors for each profile attribute;
means for determining a set of currently available contacts for a user of the user interface based, at least in part, on the client-side context data;
means for selecting a profile record from among the plurality of profile records based, at least in part, on the plurality of correspondence values and further based, at least in part, on a quantity of business contacts in the set of currently available contacts or a quantity of personal contacts in the set of currently available contacts; and
means for adapting the user interface of the portal server to the at least one usage condition based, at least in part, on the profile record.

19. The system of claim 18, wherein the means for adapting the user interface comprises means for triggering instantiation handlers based, at least in part, on control information in the profile record, wherein the instantiation handlers adapt the user interface of the portal server to the at least one usage condition by configuring at least one of theme, default skin, available content, selected content, navigation structure, available contacts, business process filtering, current instant messaging status, page layout, available portlets, page meta data for influencing portlet content, contents of personal document folder, bookmarks, favorites, user preferences, and visible virtual team rooms.

20. The system of claim 18, further comprising:
means for determining the server-side context data for the user interaction based on at least one of the incoming request, portal usage history, navigational position of a user, and currently available contacts of the user.

21. The system of claim 18, further comprising:
means for receiving the client-side context data from the client, wherein the client-side context data is based, at least in part, on a status of desktop applications of a user environment at the client.

\* \* \* \* \*